United States Patent
Mwanje et al.

(10) Patent No.: US 12,177,091 B2
(45) Date of Patent: *Dec. 24, 2024

(54) NETWORK OBJECTIVES MANAGEMENT

(71) Applicant: Nokia Solutions and Networks Oy, Espoo (FI)

(72) Inventors: Stephen Mwanje, Dorfen (DE); Lars Christoph Schmelz, Haar (DE); Janne Tapio Ali-Tolppa, Pirkkala (FI)

(73) Assignee: Nokia Solutions and Networks Oy, Espoo (FI)

( * ) Notice: Subject to any disclaimer, the term of this patent is extended or adjusted under 35 U.S.C. 154(b) by 720 days.

This patent is subject to a terminal disclaimer.

(21) Appl. No.: 17/297,760

(22) PCT Filed: Nov. 30, 2018

(86) PCT No.: PCT/EP2018/083100
§ 371 (c)(1),
(2) Date: May 27, 2021

(87) PCT Pub. No.: WO2020/108767
PCT Pub. Date: Jun. 4, 2020

(65) Prior Publication Data
US 2022/0014449 A1    Jan. 13, 2022

(51) Int. Cl.
*H04L 12/24*       (2006.01)
*H04L 41/14*       (2022.01)
(Continued)

(52) U.S. Cl.
CPC ........ *H04L 41/5009* (2013.01); *H04L 41/145* (2013.01); *H04L 41/5022* (2013.01)

(58) Field of Classification Search
CPC  H04L 41/5009; H04L 41/145; H04L 41/5022
(Continued)

(56) References Cited

U.S. PATENT DOCUMENTS

2017/0264488 A1    9/2017  Ben Ami et al.

FOREIGN PATENT DOCUMENTS

| WO | 2013/085443 A1 | 6/2013 |
| WO | 2018/042232 A1 | 3/2018 |
| WO | 2020/108768 A1 | 6/2020 |

OTHER PUBLICATIONS

"3rd Generation Partnership Project; Technical Specification Group Services and System Aspects; Study on Architecture for Next Generation System (Release 14)", 3GPP TR 23.799, V14.0.0, Dec. 2016, pp. 1-522.
(Continued)

*Primary Examiner* — Gbemileke J Onamuti
(74) *Attorney, Agent, or Firm* — Nokia Technologies Oy

(57) ABSTRACT

There are provided measures for network objectives management. Such measures for enabling network objectives management in radio access networks exemplarily comprise receiving a key performance indicator optimization input indicative of a key performance indicator and an optimization direction of said key performance indicator, deriving at least one key performance indicator entry based on said key performance indicator optimization input, said at least one key performance indicator entry comprising at least said optimization direction of said key performance indicator and prioritized target values for said key performance indicator, storing said at least one key performance indicator entry, deciding, for a cognitive function, a target value for said key performance indicator of said prioritized target values for said key performance indicator expected to be achieved by said cognitive function, and providing said decided target value for said key performance indicator and said optimization direction of said key performance indicator to said cognitive function.

20 Claims, 8 Drawing Sheets

(51) Int. Cl.
*H04L 41/5009* (2022.01)
*H04L 41/5022* (2022.01)

(58) Field of Classification Search
USPC .......................................................... 370/252
See application file for complete search history.

(56) References Cited

OTHER PUBLICATIONS

"3rd Generation Partnership Project; Technical Specification Group Radio Access Network; Evolved Universal Terrestrial Radio Access Network (E-UTRAN); X2 pplication protocol (X2AP) (Release 15)", 3GPP TS 36.423, V15.2.0, Jun. 2018, pp. 1-389.

Frenzel, "Objective-Driven Operations of Self-Organizing Networks", Dissertation, Mar. 2016, 281 pages.

Hamalainen et al., LTE Self-Organising Networks (SON): Network Management Automation for Operational Efficiency, John Wiley & Sons, Dec. 2011, pp. 40-80.

International Search Report and Written Opinion received for corresponding Patent Cooperation Treaty Application No. PCT/EP2018/083100, dated Jul. 26, 2019, 10 pages.

Action received for corresponding European Patent Application No. 18812138.8, dated Jul. 21, 2023, 3 pages.

NETWORK OBJECTIVES MANAGEMENT

RELATED APPLICATION

This application was originally filed as Patent Cooperation Treaty Application No. PCT/EP2018/083100 filed Nov. 30, 2018, each of which is incorporated herein by reference in its entirety.

FIELD

The present invention relates to network objectives management. More specifically, the present invention exemplarily relates to measures (including methods, apparatuses and computer program products) for realizing network objectives management.

BACKGROUND

The present specification generally relates to cognitive network management (CNM) in 5G (radio access) networks, but it is applicable to other generations of wireless/mobile networks, including Long Term Evolution (LTE)/Long Term Evolution Advanced (LTE-A) and future generations. With the success of self-organizing networks (SON), but also its shortcomings in terms of flexibility and adaptability to changing and complex environments, there is a strong demand for more intelligent operations, administration and management (OAM) functions to be added to the networks.

The objective of CNM is that OAM functions are enabled to
1) learn the environment they are operating in,
2) learn their optimal behavior fitting to the specific environment,
3) learn from their experiences and that of other instances of the same or different OAM functions, and
4) learn to achieve the higher-level goals and objectives as defined by the network operator.

To achieve the desired network performance, each function must achieve specific targets, which are the values or value ranges for key performance indicators (KPI) to be achieved by the system.

The targets are achieved through uni- or multi-objective optimization processes aimed at achieving higher-level service- or application-specific goals like a specific Quality of Experience (QoE). An objective in that case is the (possibly context-specific) minimization/maximization of a set of KPIs that ensures that another set of KPIs is either minimized, maximized or unaffected as desired.

In general, the success of CNM will highly depend on how well the respective targets are set for each cognitive function (CF) and in a conflict-free way, i.e., it is necessary to ensure that the achievement of one objective does not come at the cost of the achievement of other objectives.

The interpretation of higher level objectives must be done in a specific way for each subnetwork, i.e., the translation for the radio access network (RAN) is different from the translation required for the backhaul of the core network.

Doing this in a manual way (as was done for SON) is quite complex, so, automated solutions are needed for appropriately setting these targets.

For the concept of CNM, it is proposed to replace SON functions with CFs that learn optimal behavior based on their actions on the network, the observed or measured impact thereof, and using various kinds of data (e.g., network planning, configuration, performance and quality, failure, or user/service-related data).

The CFs learn actions that achieve the specific KPI targets for each respective CF. In SON, these targets were typically known to the system designer only in abstract form. Correspondingly, the system designer in the SON case either defined action policies that contribute to meeting these known targets or set termination conditions for the respective SON function.

This is not possible for CNM, since the functions will independently learn when to trigger and/or terminate specific actions, all of which depends on the specific function's objectives and targets. Moreover, it may be necessary to set the targets with consideration of the service differentiation To simplify network management, it is desirable that the detailed target setting for the individual CFs is as much as possible also automated, i.e. the operator shall be able to specify its higher-level goals (desired behavior of the network) and an automation module translates these goals into trigger conditions and achievement targets for the CFs.

Concurrently, the respective targets need to be set in such a way that the CFs are (or the entire CNM is) able to manage their conflicts to find compromises among conflicting targets.

A general problem for network management remains the maximizing of the value to the operator and its shareholders (i.e. maximizing the revenue to cost ratio) while maximizing the network quality (which is to the benefit of customers and regulators). Correspondingly, network management will involve three major tasks, i.e.
1) minimizing cost e.g. by minimizing number of cells, energy use, etc.
2) maximizing revenue e.g. maximizing user admission, and
3) maximizing quality (of service/experience), e.g. maximizing service availability, throughput, or minimizing latency, interruptions, drops, link failures etc.

A challenge then is how to translate these high-level goals into low-level actions on the network.

An external system is proposed considering envisaged policy-based, goal-based, and objective-based network management, wherein the external system sets policies or rules for an underlying optimization function which then manages the network.

Therein, a policy may be defined as a statement of the operator's desired network behavior, i.e. it informs the network to "Behave in such a way such that . . . ". The policy defines the desired behavior either by setting targets, defining utilities of states, setting (non)acceptable states or defining actions. Three kind of policies are characterized:
  a) Action policy: Change parameter(s) pi to pi=p or by $\delta P$,
  b) Goal policy: This states a specific desired state for a measure (KPI) i.e. KPI ki sym k, where "sym" $\epsilon [=, \neq, <, >, \leq, \geq]$, and
  c) Utility Functions policy: This gives a comparison of states e.g. k=k1<->k=k2; where "<->" means "preferred (change) to".

This same structure applies for CNM in that a separate module sets targets which must be achieved by the CFs.

A SON objective manager is proposed as a module deriving context specific targets for each SON function using the vendors' SON functional model (a behavior model for each SON function), wherein objective based network management (OBNM) can be applied in the SON environment by defining context specific utility functions that are then used to configure and control the SON functions.

The CNM environment can however not rely on SON-style utility functions, since CNM uses independent learning-based optimization functions whose optimal actions are learned through experience. In particular, function models cannot be developed for the cognitive function since their learning nature indicates a non-deterministic behavior. In that respect, only the targets that need to be achieved by the CFs need to be defined.

A CF framework decomposing the work of an intelligent OAM function for a realistic implementation of CNM comprises five major components.

FIG. 4 is a schematic diagram illustrating an example of a system environment and in particular a network objectives manager NOM within the CNM system.

As illustrated in FIG. 4, the five major components are:
1) A Network Objectives Manager (NOM) which interprets operator service and application goals for CNM or for the specific CF to ensure that the CF adjusts its behavior in line with those goals,
2) An Environment Modelling & Abstraction (EMA) which learns to abstract the environment into states which are used for subsequent decision making in the other components,
3) A Configuration Management Engine (CME) which defines, learns and refines the permissible candidate network configurations for the different contexts of the CF,
4) A Decision & Action Engine (DAE) or simply Decision Application (DApp) which learns and matches the current abstract state (as derived by the EMA module) to the appropriate network configuration ('active configuration') selected from the set of legal/acceptable candidate network configurations (in practice multiple DApps may be required with each designed to focus on a specific network challenge like optimizing energy efficiency or maximizing mobility robustness), and
5) A Coordination Engine (CE) which needs to coordinate the actions and recommendations of multiple DAEs or CFs (even amidst the non-deterministic behavior of the DAEs or CFs resulting from their learning nature).

According to this concept illustrated in FIG. 4, the NOM provides its interpretation of the operator and service goals as input to the other blocks that then accordingly adjust their internal structures and subsequently their behavior.

The CNM (and the CFs) is (are) configured with the desired KPI targets and their relative importance, which then the CFs attempt to achieve through learning the effects of different network configurations.

Without the NOM, such targets would be manually set by the operator who analyses the overall business and technical goals (or Key Quality Indicators, KQI) to derive the network KPI targets and their relative priorities. The NOM may replace this manual operation by breaking down the input KQIs into the output which are the weighted/prioritized KPI targets. The input (operator goals or KQIs) may usually be at a different level of abstraction compared to the outputs.

The above concept leaves open the internal design and/or realization of the NOM.

Hence, the problem arises that if CNM including a NOM is intended to be implemented, the NOM and in particular a sub-network specific NOM and its respective interfaces need to be specified.

Hence, there is a need to provide for network objectives management.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method for enabling network objectives management in radio access networks, the method comprising receiving a key performance indicator optimization input indicative of a key performance indicator and an optimization direction of said key performance indicator, deriving at least one key performance indicator entry based on said key performance indicator optimization input, said at least one key performance indicator entry comprising at least said optimization direction of said key performance indicator and prioritized target values for said key performance indicator, storing said at least one key performance indicator entry, deciding, for a cognitive function, a target value for said key performance indicator of said prioritized target values for said key performance indicator expected to be achieved by said cognitive function, and providing said decided target value for said key performance indicator and said optimization direction of said key performance indicator to said cognitive function.

According to an exemplary aspect of the present invention, there is provided an apparatus for enabling network objectives management in radio access networks, the apparatus comprising at least one processor, at least one memory including computer program code, and at least one interface configured for communication with at least another apparatus, the at least one processor, with the at least one memory and the computer program code, being configured to cause the apparatus to perform receiving a key performance indicator optimization input indicative of a key performance indicator and an optimization direction of said key performance indicator, deriving at least one key performance indicator entry based on said key performance indicator optimization input, said at least one key performance indicator entry comprising at least said optimization direction of said key performance indicator and prioritized target values for said key performance indicator, storing said at least one key performance indicator entry, deciding, for a cognitive function, a target value for said key performance indicator of said prioritized target values for said key performance indicator expected to be achieved by said cognitive function, and providing said decided target value for said key performance indicator and said optimization direction of said key performance indicator to said cognitive function.

According to an exemplary aspect of the present invention, there is provided an apparatus for enabling network objectives management in radio access networks, the apparatus comprising receiving circuitry configured to receive a key performance indicator optimization input indicative of a key performance indicator and an optimization direction of said key performance indicator, deriving circuitry configured to derive at least one key performance indicator entry based on said key performance indicator optimization input, said at least one key performance indicator entry comprising at least said optimization direction of said key performance indicator and prioritized target values for said key performance indicator, storing circuitry configure to store said at least one key performance indicator entry, deciding circuitry configured to decide, for a cognitive function, a target value for said key performance indicator of said prioritized target values for said key performance indicator expected to be achieved by said cognitive function, and providing circuitry configured to provide said decided target value for said key performance indicator and said optimization direction of said key performance indicator to said cognitive function.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient provision of mechanisms and interfaces through which the target setting can be automated to allow the operator to focus on the higher-level (operational) objectives, and in particular the design and realization of a Sub-Network Objective Translator (SNOT) in a CNM system, to thereby solve at least part of the problems and drawbacks identified in relation to the prior art.

By way of exemplary embodiments of the present invention, there is provided network objectives management. More specifically, by way of exemplary embodiments of the present invention, there are provided measures and mechanisms for realizing network objectives management.

Thus, improvement is achieved by methods, apparatuses and computer program products enabling/realizing network objectives management.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) network objectives management, in particular in relation to sub-network objectives translation.

In general, according to exemplary embodiments of the present invention, an SNOT is provided, and its respective interfaces are specified.

Although an NOM may be foreseen as generic function, it cannot be realized as such, since each subnetwork (e.g. RAN, backhaul, etc.) has different requirements from the other subnetworks.

Consequently, sub-network specific translation of operational objectives will be different for each sub-network to the extent that it may even require sub-network specific expert-knowledge in realizing it.

According to exemplary embodiments of the present invention, the SNOT focusses on the automated translation of the operator's operational objectives into specific targets and the resolution of conflicts among KPI targets.

Figure 5:
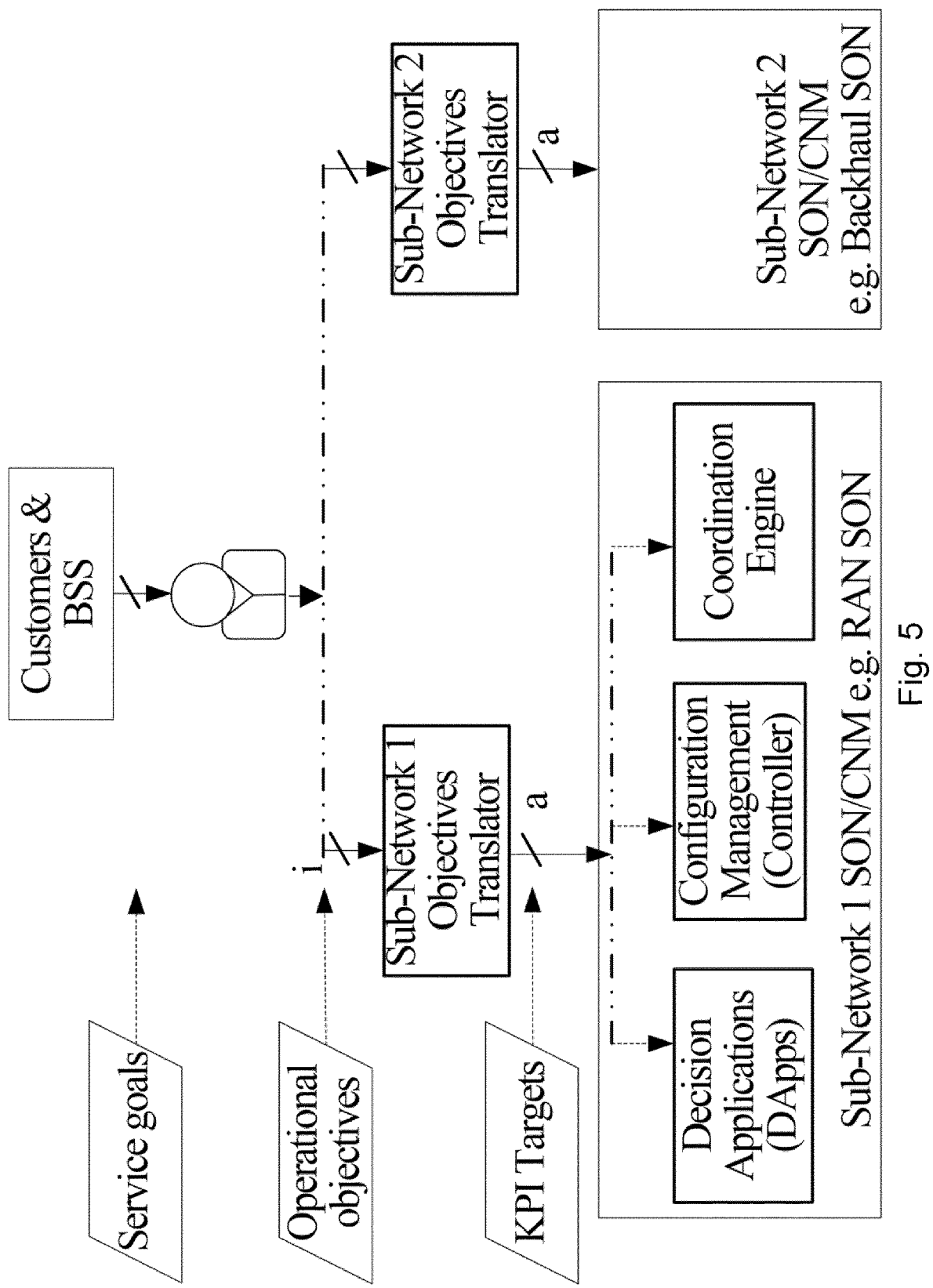
FIG. 5 is a schematic diagram illustrating an example of a system environment and in particular information exchanged among different service and network management functions according to exemplary embodiments of the present invention.

It is an objective interpretation function that takes the operator's objectives and derives specific KPI targets for the cognitive functions (CFs) as illustrated by FIG. 5. An SNOT according to exemplary embodiments of the present invention is characterized by two interfaces, an operator interface i, and the CFs interface a.

According to exemplary embodiments of the present invention, through interface i, the operator submits operational objectives and controls the SNOT and subsequently the behavior of the CF and the underlying network. The operator may for example define, edit and then adjust targets as well as set KPI priorities based on their desired expectations of service performance.

In return, according to exemplary embodiments of the present invention, the SNOT informs the operator about its observations on the network e.g. about observed conflicts and constraints that cannot be resolved. The SNOT may for example indicate that a particular KPI target cannot be achieved owing to some other KPI that would otherwise be degraded. The operator may then correspondingly have to change the prioritizations of KPIs.

According to exemplary embodiments of the present invention, on interface a, the SNOT defines the expectations for each CF and for the CNM. These expectations are specifically the targets to be achieved by the CNM on the particular KPIs.

Such targets should have accounted for the potential conflicts among the KPIs so that a higher priority KPI target should be achieved by all means—even at the cost of degrading a lower priority KPI. In return, according to exemplary embodiments of the present invention, CFs return information relating to their observations to which the SNOT is supposed to respond. The CE may for example highlight targets that cannot be reached, e.g. due to conflicts among the targets. Such a response could be that "target x cannot be achieved because it causes problems on higher priority target y".

According to exemplary embodiments of the present invention, the SNOT may then either adjust the set targets and prioritizations or may request further guidance from the operator.

Figure 1:
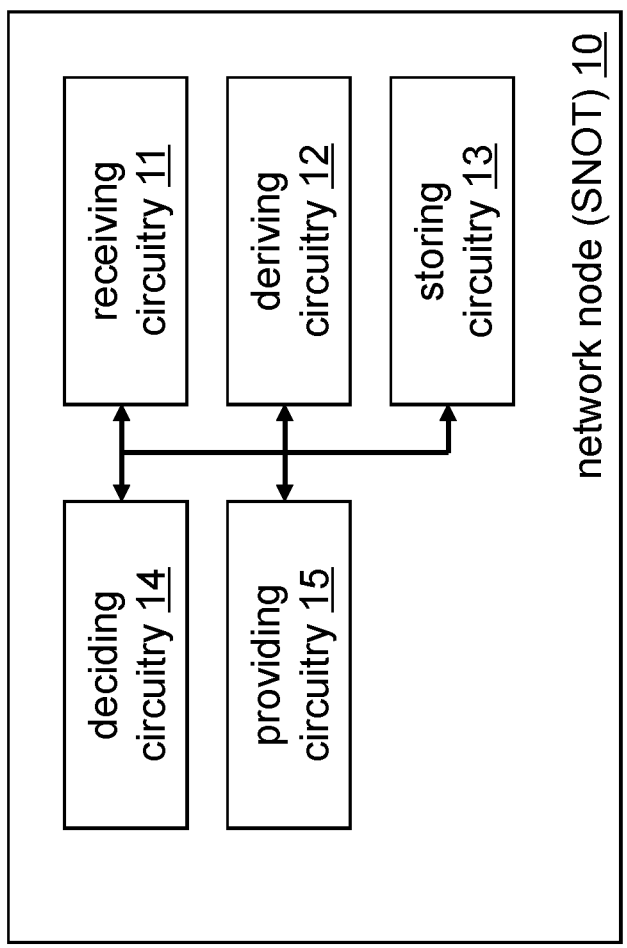
FIG. 1 is a block diagram illustrating an apparatus according to exemplary embodiments of the present invention.
Figure 3:
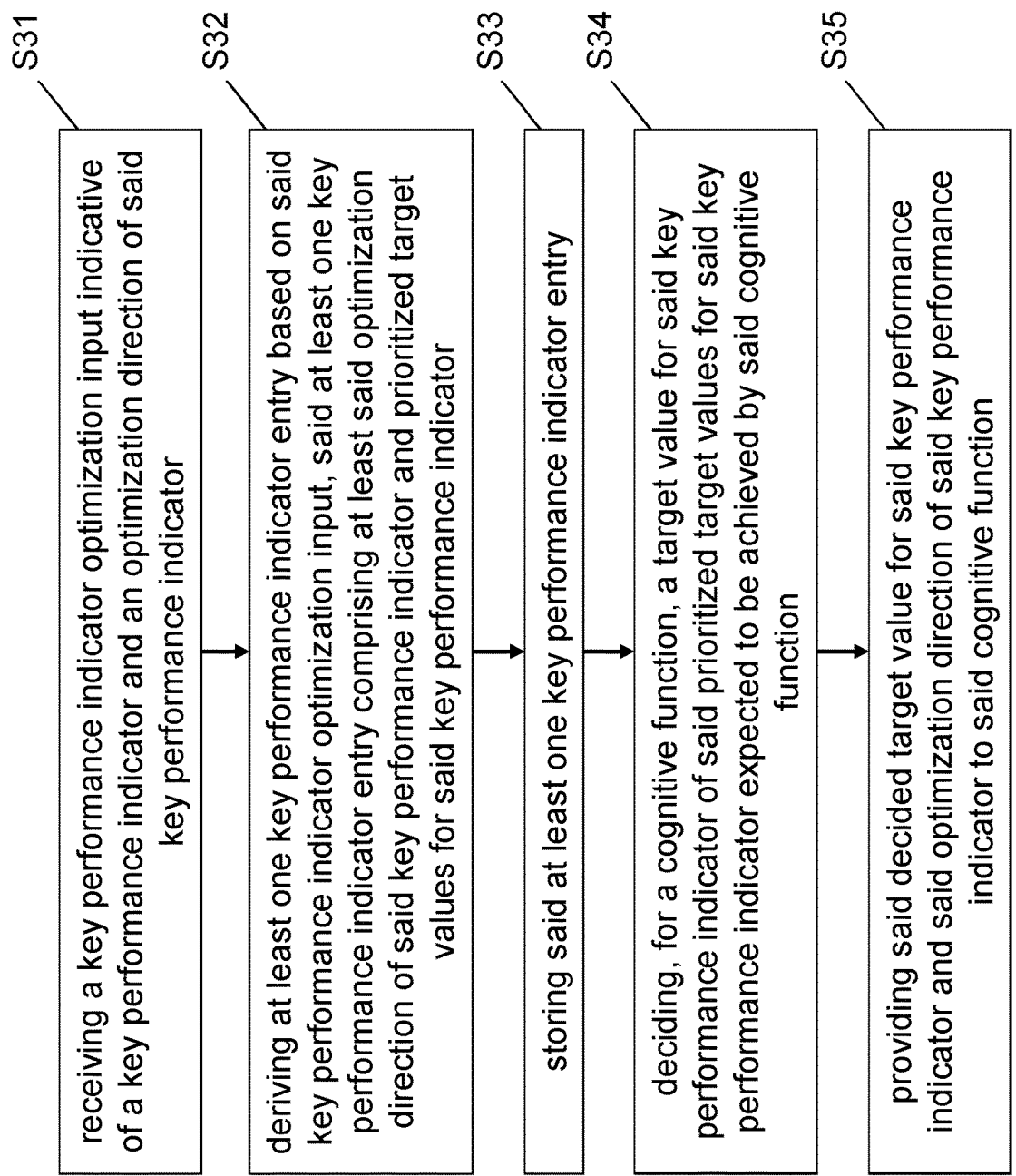
FIG. 3 is a schematic diagram of a procedure according to exemplary embodiments of the present invention.
Figure 4:
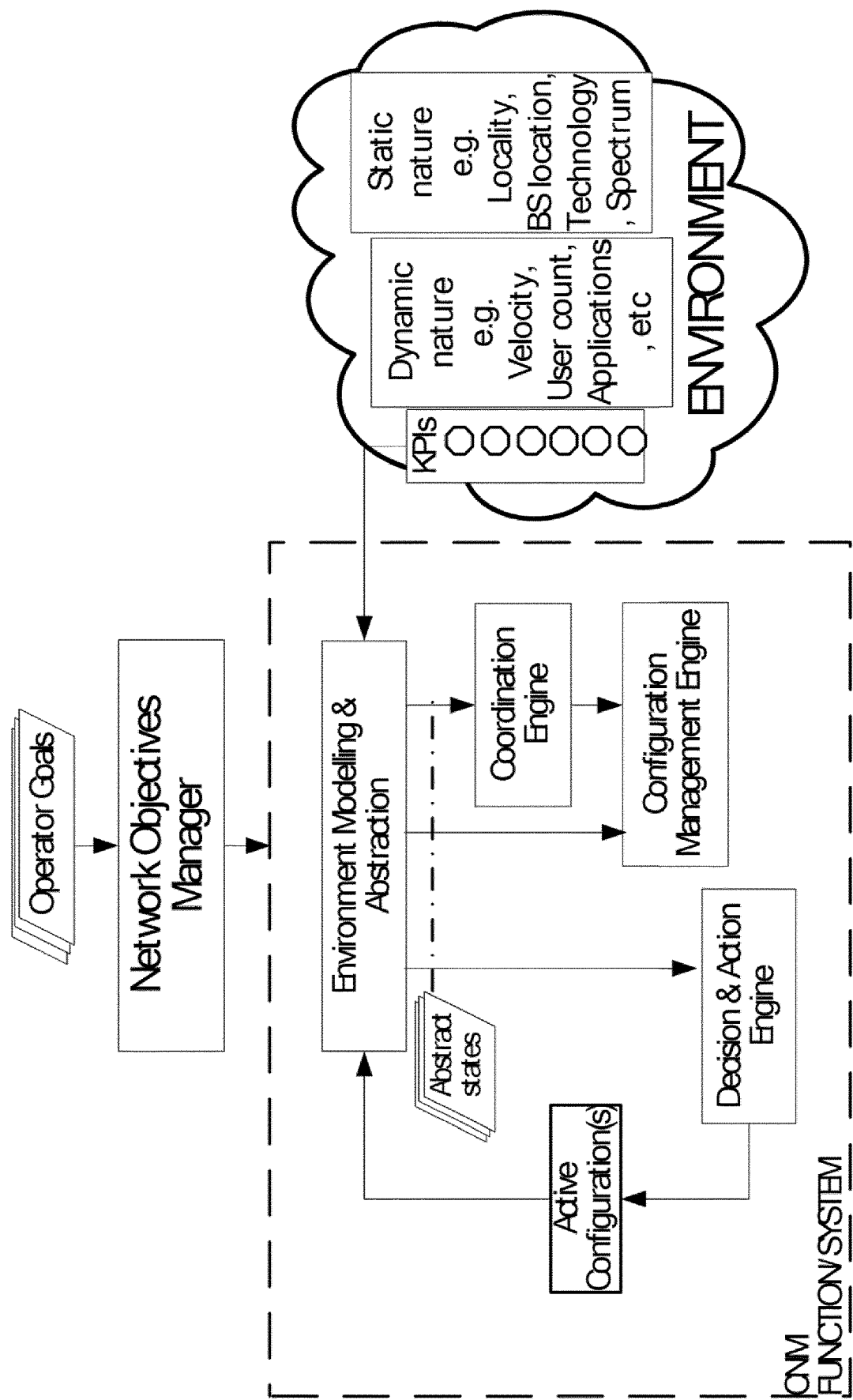
FIG. 4 is a schematic diagram illustrating an example of a system environment and in particular a network objectives manager NOM within the CNM system.

FIG. 1 is a block diagram illustrating an apparatus according to exemplary embodiments of the present invention in more detail. The apparatus may be a network node 10 such as a sub-network objective translator or a network entity providing such sub-network objective translator, for enabling network objectives management in radio access networks, the apparatus 10 comprising a receiving circuitry 11, a deriving circuitry 12, a storing circuitry 13, a deciding circuitry 14, and a providing circuitry 15. The receiving circuitry 11 receives a key performance indicator optimization input indicative of a key performance indicator and an optimization direction of said key performance indicator. The deriving circuitry 12 derives at least one key performance indicator entry based on said key performance indicator optimization input, said at least one key performance indicator entry comprising at least said optimization direction of said key performance indicator and prioritized target values for said key performance indicator. The storing circuitry 13 stores said at least one key performance indicator entry. The deciding circuitry 14 decides, for a cognitive function, a target value for said key performance indicator of said prioritized target values for said key performance indicator expected to be achieved by said cognitive function. The providing circuitry 15 provides said decided target value for said key performance indicator and said optimization direction of said key performance indicator to said cognitive function. FIG. 3 is a schematic diagram of a procedure according to exemplary embodiments of the present invention. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to exemplary embodiments of the present invention comprises an operation of receiving (S31) a key performance indicator optimization input indicative of a key performance indicator and an optimization direction of said key performance indicator, an operation of deriving (S32) at least one key performance indicator entry based on said key performance indicator optimization input, said at least one key performance indicator entry comprising at least said optimization direction of said key performance indicator and prioritized target values for said key performance indicator, an operation of storing (S33) said at least one key performance indicator entry, an operation of deciding (S34), for a cognitive function, a target value for said key performance indicator of said prioritized target values for said key performance indicator expected to be achieved by said cognitive function, and an operation of providing (S35) said decided target value for said key performance indicator and said optimization direction of said key performance indicator to said cognitive function.

Figure 2:
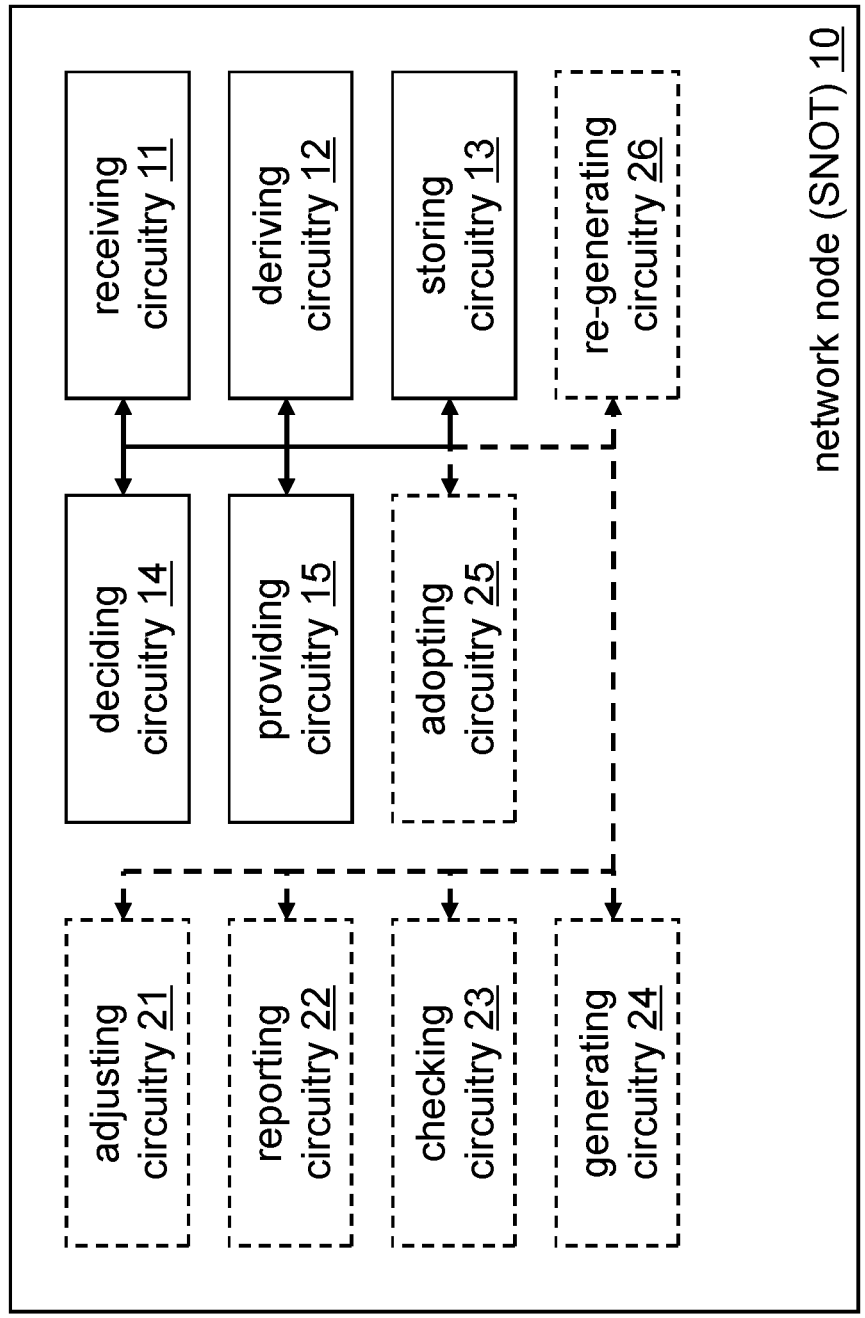
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise adjusting circuitry 21, reporting circuitry 22, checking circuitry 23, generating circuitry 24, adopting circuitry 25, and/or re-generating circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to exemplary embodiments of the present invention, said deciding (S34) is based on a priority assigned to said respective target value in said prioritized target values.

According to a variation of the procedure shown in FIG. 3, exemplary additional operations are given, which are inherently independent from each other as such. According to such variation, an exemplary method according to exemplary embodiments of the present invention may comprise an operation of receiving, from said cognitive function, observations on conflicts with respect to said target value for said key performance indicator.

According to exemplary embodiments of the present invention, said deriving (S32) is based on said observations on conflicts with respect to said target value for said key performance indicator.

According to exemplary embodiments of the present invention, said deciding (S34) is based on said observations on conflicts with respect to said target value for said key performance indicator.

According to a variation of the procedure shown in FIG. 3, exemplary additional operations are given, which are inherently independent from each other as such. According to such variation, an exemplary method according to exemplary embodiments of the present invention may comprise an operation of adjusting priorities assigned to each target value in said prioritized target values based on said observations on conflicts with respect to said target value for said key performance indicator.

According to a variation of the procedure shown in FIG. 3, exemplary additional operations are given, which are inherently independent from each other as such. According to such variation, an exemplary method according to exemplary embodiments of the present invention may comprise an operation of reporting on said observations on conflicts with respect to said target value for said key performance indicator to a higher instance.

According to a variation of the procedure shown in FIG. 3, exemplary additional operations are given, which are inherently independent from each other as such. According to such variation, an exemplary method according to exemplary embodiments of the present invention may comprise an operation of checking consistency of said target value decided for said cognitive function with said optimization direction of said key performance indicator and/or external requirements on said target value for said key performance indicator.

According to exemplary embodiments of the present invention in relation to an objective definition operation, said key performance indicator optimization input comprises at least said optimization direction of said key performance indicator, an optimal target value for said key performance indicator, and a target value generation step size. Further, said deriving (S32) is based on said optimization direction of said key performance indicator, said optimal target value for said key performance indicator, and said target value generation step size.

According to a variation of the procedure shown in FIG. 3 in relation to the objective definition operation, exemplary details of the deriving operation (S32) are given, which are inherently independent from each other as such. Such exemplary deriving operation (S32) according to exemplary embodiments of the present invention may comprise an operation of generating a highest priority value of said prioritized target values for said key performance indicator by adopting said optimal target value for said key performance indicator and a predetermined number of lower priority values with decreasing priority by, dependent on said optimization direction of said key performance indicator, adding or subtracting said target value generation step size to or from the preceding generated target value.

According to exemplary embodiments of the present invention in relation to the objective definition operation, said key performance indicator optimization input is defined as setKPI_Objective KPI_name Objective optimal target KPI_step, with KPI_name being a name of said key performance indicator, Objective being said optimization direction of said key performance indicator, optimal_target being said optimal target value for said key performance indicator, and KPI_step being said target value generation step size.

According to a variation of the procedure shown in FIG. 3 in relation to a target definition operation, exemplary additional operations are given, which are inherently independent from each other as such. According to such variation, an exemplary method according to exemplary embodiments of the present invention may comprise an operation of receiving a key performance indicator definition input comprising at least said optimization direction of said key performance indicator and said prioritized target values for said key performance indicator. Further, said deriving (S32) is based on said optimization direction of said key performance indicator and said prioritized target values for said key performance indicator.

According to a variation of the procedure shown in FIG. 3 in relation to the target definition operation, exemplary details of the deriving operation (S32) are given, which are inherently independent from each other as such. Such exemplary deriving operation (S32) according to exemplary embodiments of the present invention may comprise an operation of adopting said optimization direction of said key performance indicator and said prioritized target values for said key performance indicator.

According to exemplary embodiments of the present invention in relation to the target definition operation, said key performance indicator definition input is defined as setKPI_targets KPI_name: [Objective, K[1] value, K[2] value, K[k] value], with KPI_name being a name of said key performance indicator, Objective being said optimization direction of said key performance indicator, and K[k] value being the target value with priority k.

According to exemplary embodiments of the present invention in relation to the target definition operation, said key performance indicator definition input comprises information in relation to a context in which said optimization direction of said key performance indicator and said prioritized target values for said key performance indicator are expected to be achieved by a respective cognitive function.

According to a variation of the procedure shown in FIG. 3 in relation to a target adjustment operation, exemplary additional operations are given, which are inherently independent from each other as such. According to such variation, an exemplary method according to exemplary embodiments of the present invention may comprise an operation of receiving a key performance indicator adjustment input comprising at least a modification direction of said key performance indicator and a target value modification step size. Further, said deriving (S32) is based on said modification direction of said key performance indicator and said target value modification step size.

According to a variation of the procedure shown in FIG. 3 in relation to the target adjustment operation, exemplary details of the deriving operation (S32) are given, which are inherently independent from each other as such. Such exemplary deriving operation (S32) according to exemplary embodiments of the present invention may comprise an operation of re-generating each target value of said prioritized target values by, dependent on said modification direction of said key performance indicator, adding or subtracting said target value modification step size to or from said each target value of said prioritized target values.

According to exemplary embodiments of the present invention in relation to the target adjustment operation, said key performance indicator optimization input is defined as Lower_KPItargets KPI_name KPI_step, with KPI_name being a name of said key performance indicator, and KPI_step being said target value modification step size.

In more specific terms, in order to specify the nature and operation of the SNOT, it is distinguished between service goals and the operational objectives.

SNOT Inputs: Service Goals and Operational Objectives:

1) Service goals are derived from the expectations and requirements of the supported services i.e. the QoE measured in terms of latency, availability, etc. An example service goal may for example be to "improve availability", "reduce service interruption", "lower latency". Such goals are abstract and subjective. Thus, such goals need to be interpreted by the operator into operational objectives.

2) Operational Objectives describe (as a focus) to maximize or minimize a specific KPI k∈K while maintaining KPIs i∈K (i≠k) in acceptable states. To aid in setting the targets, according to exemplary embodiments of the present invention, the operational objective may be augmented with extra information including, e.g., the steps between the different prioritization levels. The term objective used here refers to a specific task of either a minimization or a maximization, while operational objective may be a sub task aimed at the achieving the minimization or maximization, e.g. the reduction of the target value. The operational objectives and their related operations are the inputs of the operator to the SNOT.

According to exemplary embodiments of the present invention, on the input, the SNOT takes the operational objectives from which it computes the KPI targets. This frees the operator from defining policies in terms of state-specific actions, goals or utilities. Instead, according to the exemplary embodiments of the present invention, the SNOT takes preferences on KPI values that are expressed in terms of KPI priority levels.

3) KPI Priority levels describe different desirability levels for the values of a given KPI. To allow for coordination among conflicting KPIs, according to exemplary embodiments of the present invention, the different desirability levels for the values of a given KPI are provided, with the most stringent being the one that must be achieved regardless of conditions. The priorities attempt to distinguish the values (V1, V2, ... Vn) of a KPI in statement as: "V1 must be achieved", "V2 would be preferred is possible", "Vn is the best value that is expected". The prioritization structure is an internal design of the SNOT that supports in managing the conflicts and constrain among the KPIs.

Below, an exemplary matrix of KPI prioritizations which may be input to the SNOT according to exemplary embodiments of the present invention is illustrated. The illustrated matrix is to schematically explain the possible input to the SNOT according to the concept of the present invention but does not limit exemplary embodiments of the present invention to the shown values.

| KPI name | Objective | Priority 1 | Priority 2 | Priority 3 | Priority 4 | Priority 5 |
|---|---|---|---|---|---|---|
| Radio Link failure (RLF) | minimize | 0.2 | 0.15 | 0.1 | | |
| Cell load | maximize | 0.75 | 0.80 | 0.82 | 0.84 | 0.85 |
| . | | | | | | |
| . | | | | | | |
| . | | | | | | |

SNOT Internal Logic and Outputs:

According to exemplary embodiments of the present invention, the SNOT abstracts the lower KPI targets into higher operational goals through an internal structure or map of KPI priorities. This is the interpretation of the KPI prioritizations which requires the optimization function to "ensure that KPI achieves a value v with priority p, i.e. $k<=[kTj, j=1, \ldots n]$ with priority $[pj, j=1, \ldots n]$".

The assumption according to the concept of the present invention is that the targets set in the achievement as a certain KPI level will not degrade another KPI target at the same or higher priority. It is noted that according to exemplary embodiments of the present invention, targets may be context specific, but they do not have to be, since the underlying CFs are after all expected to learn context specific behavior.

According to exemplary embodiments of the present invention, the outputs are specific targets for the underlying cognitive functions, i.e. a hash of KPI_name: KPI_target indicating the values that the CNM system should (as a whole) ensure to achieve. In principle, the SNOT decides the equilibrium column in the table/matrix shown above, if a column is achievable, or it selects the specific values to achieve for KPI. Accordingly, the SNOT according to exemplary embodiments of the present invention resolves conflicts among KPIs.

According to further exemplary embodiments of the present invention, the SNOT checks for the consistence of the computed targets for the specific KPI and against other KPIs. Thereafter, the SNOT keeps and tracks all the managed KPIs in an internal database with which the NSOT even learns the relations among KPIs. Finally, the SNOT sets the KPI targets for the other CFs in the CNM system.

In the reverse direction, according to exemplary embodiments of the present invention, the SNOT receives feedback from the CFs about targets that have been achieved or not. For the achieved targets, the SNOT chooses to tighten the target where possible, or otherwise, e.g. where the target is not achieved, the SNOT use that information to learn the necessary relations and corresponding action.

In concrete terms, a requirement underlying exemplary embodiments of the present invention is that each KPI must have target values with varying prioritization.

Thus, according to the present invention, a generic priority function is defined with k priority levels, i.e. $P=[1, 2, \ldots, k]$, where the lower the priority level is, the more desirable a target is.

For example if KPI K targets K[i] such that K[1]=0.5, K[2]=0.4 and k[3]=0.3, it implies that the most desired target for the KPI is 0.5 followed by 0.4, and finally 0.3. In other words, values of K>0.5 are very unacceptable but values of e.g. K<0.3 may be desired if no other KPIs are adversely affected.

Figure 6:
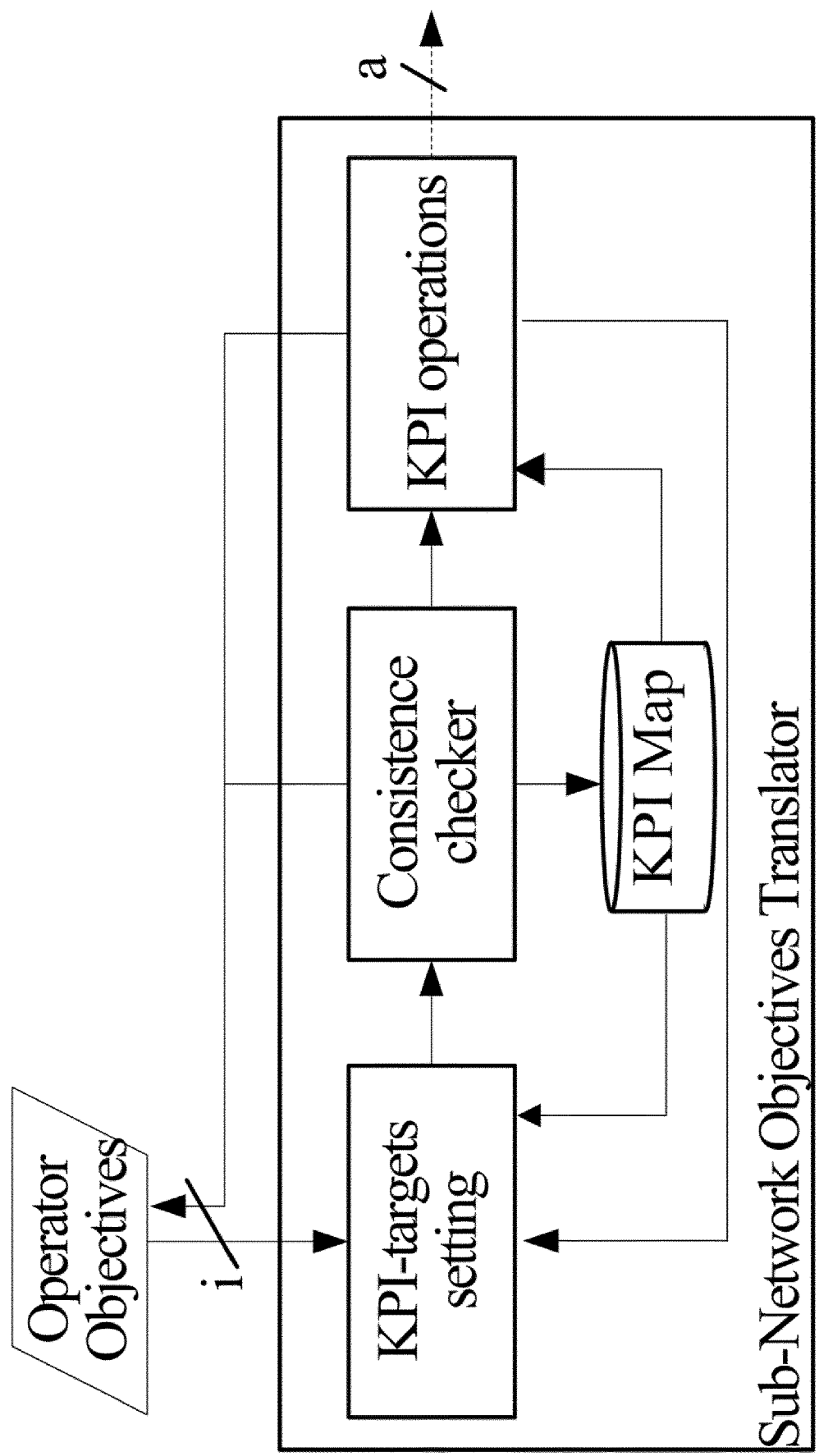
FIG. 6 is a schematic diagram illustrating an example of a system environment and in particular constituent components of an SNOT according to exemplary embodiments of the present invention.

Components:

To be able to take high-level operator goals and derive specific targets for the CFs, according to exemplary embodiments of the present invention, the SNOT is composed of four modules as illustrated in FIG. 6.

FIG. 6 is a schematic diagram illustrating an example of a system environment and in particular constituent components of a SNOT according to exemplary embodiments of the present invention.

The present invention is not limited to the structure illustrated in FIG. 6. Instead, some modules illustrated in FIG. 6 may be merged, or the functionality of a module shown in FIG. 6 may be divided into two or more (sub) modules.

1) A KPI database that holds information on all managed KPIs. Within the SNOT, each KPI may be identified with the following fields:
   {KPI_name, [contexts], objective=min/max, optimal_value, default_step_size, targets};
2) A KPI-targets management module which creates and optimizes the targets at the different levels. For example, given a KPI name, an objective and step size, the KPI-targets management module creates the targets at the different prioritizations. The KPI-targets management module can also adjust existing KPI targets on request, e.g. by adjusting each of the target values by a value equivalent to the step_size.
3) A consistent checker that ensures that the targets to be published are consistent with the selected objective. According to exemplary embodiments of the present invention, the consistent checker may also need to refer to other KPIs in the map. According to exemplary embodiments of the present invention, the consistent checker may also learn the correlations among KPIs, namely, even the operations need to figure out how much they impact each other. According to exemplary embodiments of the present invention, the consistent checker may verify how and what to learn from the a-interface.

4) A KPI operations module that manages the instantaneous target values for different KPIs. For example, if for a given KPI a target cannot be met, the KPI operations module may adjust the value as needed.

KPI Target Setting:

The KPI target setting according to exemplary embodiments of the present invention provides the input interface to the operator through which the SNOT captures the operators' requirements or expectations from the network. For a given operator request, the SNOT checks the KPI map for existence of the KPI and creates it if it does not exist. Thereafter, the SNOT sends the proposed KPI target to the consistence checker to be approved before publishing it in a KPImap.

According to exemplary embodiments of the present invention, the following operations can be performed:

Objective Definition Operation (ODO)

According to the ODO, targets may be derived from a higher-level objective function. According to exemplary embodiments of the present invention, a means is provided to manually set the objectives, i.e. a command through the operator sets the targets for a given KPI. The respective interface for a KPI named "KPI-name" may be defined with a step-size "KPI_step" between priority levels in the form setKPI_Objective KPI_name Objective optimal_target KPI_step;

According to exemplary embodiments of the present invention, the respective KPI targets are then computed by the target setting module and subsequently evaluated by the consistence checker before being published to the CFs.

Target Definition Operation (TDO)

According to exemplary embodiments of the present invention, for the TDO a means is provided to manually set the targets, i.e. by using a command with which the operator sets the targets for a given KPI. The respective interface for a KPI named "KPI_name" over "k" priority levels may be a command in the form setKPI_targets KPI_name: [Objective, K[1] value, K[2] value, . . . , K[k] value];

As earlier stated, according to exemplary embodiments of the present invention, the target may also be context specific in which case the interface may be in the form setKPI_targets (KPI_name, context 1): [Objective, K[1] value, K[2] value, . . . , K[k] value];

According to exemplary embodiments of the present invention, the thus input objective is then first evaluated by the consistence checker before being published to the CFs.

According to further exemplary embodiments of the present invention, the TDO may also be used to edit an existing target, e.g. a target which was created automatically.

Target Adjustment Operation (TAO)

According to exemplary embodiments, the operator is able to request for certain KPI's targets to be adjusted, e.g. on realizing that they block optimization of another KPI. In case of such command, the SNOT adjusts all the priorities of the KPI's targets either by a value equivalent to the default step_size or by an optionally stated step size "KPI_step". According to exemplary embodiments of the present invention, a corresponding command may be in the form Lower_KPItargets KPI_name KPI_step;

Return Interface

According to exemplary embodiments of the present invention, in case a target cannot be reached, the CF/CNM is able to inform the SNOT of such conflict(s). As already mentioned above, the SNOT may then either automatically adjust the targets or inform the operator about such conflict(s).

Consistence Checker:

According to exemplary embodiments of the present invention, for a given KPI targets prioritization, the consistence checker conforms that the objective matches with the prioritization values, e.g., that a minimization has the highest value at the lowest priority. The consistence checker also checks for appropriateness of values, e.g., that a KPI adjustment does not set a KPI target outside the acceptable range, e.g., in negatives for count or rate values.

According to exemplary embodiments of the present invention, the consistence checker is implemented as a rule engine that evaluates the truthfulness of different conditions. However, the consistence checker according to exemplary embodiments of the present invention is not limited to such implementation.

KPI Operations:

According to further exemplary embodiments of the present invention, KPI operations provide the operations interface with the CNM system. KPI operations (interface) works as the sending agent for the KPI targets on the 'a' interface. KPI operations (interface) also manages KPI changes based on feedback from the CNM system. For example, KPI operations (interface) may decide the reduction of a KPI value (to within a configured limit) in case of conflicts with another KPI FIG. 7 (in a CAN framework including functions of a CAN system and related cognitive functions) is a schematic diagram illustrating an example of a system environment with signaling variants according to exemplary embodiments of the present invention, in particular a concrete example of a response to conflicts among KPI targets.

Figure 7:
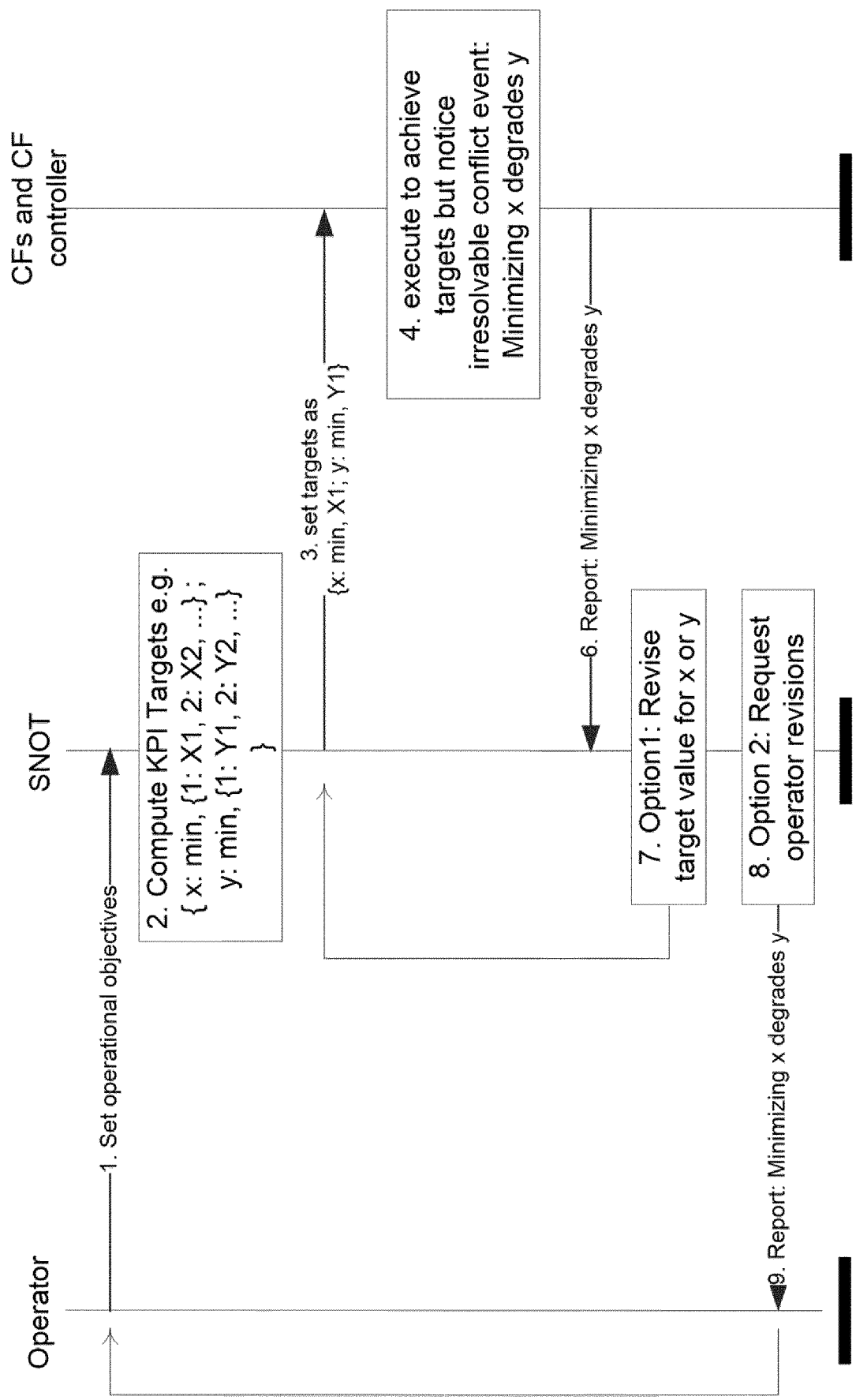
FIG. 7 is a schematic diagram illustrating an example of a system environment with signaling variants according to exemplary embodiments of the present invention.

Specifically, in FIG. 7 an example operation of the SNOT together with the larger CNM system is illustrated.

In step 1 of FIG. 7, the operator sets operational objectives in the SNOT.

In step 2 of FIG. 7 the SNOT computes KPI targets for the set of SON/CNM functions, e.g.

{
   x: min, {1: X1, 2: X2, ...};
   y: min, {1: Y1, 2: Y2, ...}
}

In step 3 of FIG. 7, the SNOT sets targets as {KPI: objective, target_value}. For the example, setting of two KPIs x, y with the objectives minimize x and minimize y and targets set as {x: min, X1; y: min, Y1} is assumed.

In step 4 of FIG. 7, CFs/CNM attempt to achieve targets, in other words, execute to achieve targets, but notice an irresolvable conflict event (lock). Namely, minimizing x degrades y. In other words, with x at level X2 on trying to further minimize x, y increases beyond the already achieved target Y1.

In step 5 of FIG. 7, CFs/CNM reports to SNOT that minimizing x degrades y, e.g., CNM controller reports to SNOT that target y is blocking the system from achieving target X1.

Based on this reporting, the SNOT may either (option 1, step 7 of FIG. 7) revise the target value for x or y, or may (option 2, step 8 of FIG. 7) request operator revisions. Upon option 2, in step 9 of FIG. 7, the SNOT reports to the operator that minimizing x degrades y.

In other words, based on the reporting of the CFs/CNM/CNM controller, according to this specific example, the SNOT either:

a) Based on its known prioritizations, raises target_value for y to Y1+y_step, or
b) Based on its known prioritizations, raises target_value for x to X1+y_step, or
c) If (e.g.) already adjusted the targets earlier, requests the operator to reconsider the given prioritizations.

According to the present invention, the management of performance targets for cognitive functions is advantageously simplified, and a need for operators to manually set the values of the optimization targets is removed. Hence, due to implementation of the present invention, operators can advantageously instead focus on the translation of higher level service goals into operational objectives.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network node (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
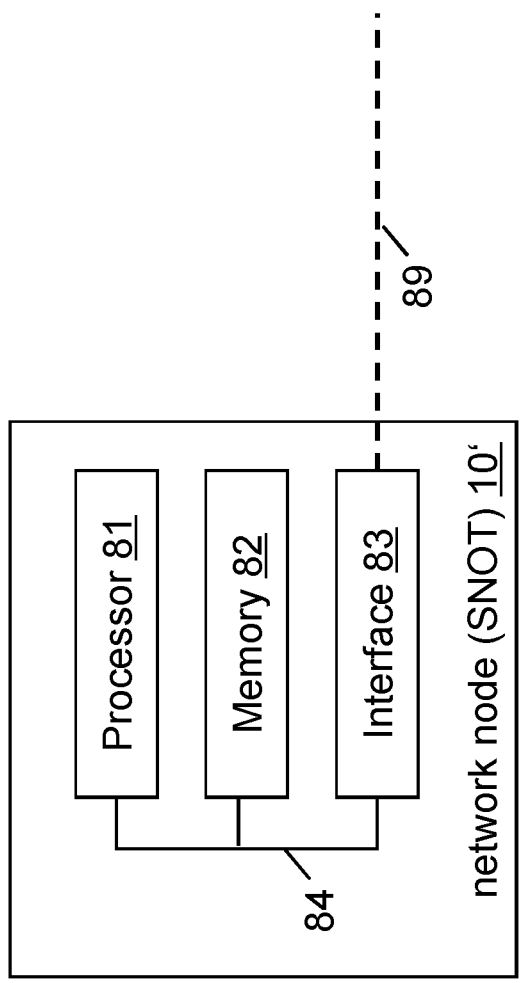
FIG. 8 is a block diagram alternatively illustrating an apparatus according to exemplary embodiments of the present invention.

In FIG. 8, an alternative illustration of an apparatus according to exemplary embodiments of the present invention is depicted. As indicated in FIG. 8, according to exemplary embodiments of the present invention, the apparatus (network node) 10' (corresponding to the network node 10) for enabling network objectives management in radio access networks comprises a processor 81, a memory 82 and an interface 83, which are connected by a bus 84 or the like, and the apparatus may be connected via link 89 to e.g. other apparatuses.

The processor 81 and/or the interface 83 may also include a modem or the like to facilitate communication over a (hardwire or wireless) link, respectively. The interface 83 may include a suitable transceiver coupled to one or more antennas or communication means for (hardwire or wireless) communications with the linked or connected device(s), respectively. The interface 83 is generally configured to communicate with at least one other apparatus, i.e. the interface thereof.

The memory 82 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 for enabling network objectives management in radio access networks comprises at least one processor 81, at least one memory 82 including computer program code, and at least one interface 83 configured for communication with at least another apparatus. The processor (i.e. the at least one processor 81, with the at least one memory 82 and the computer program code) is configured to perform receiving a key performance indicator optimization input indicative of a key performance indicator and an optimization direction of said key performance indicator (thus the apparatus comprising corresponding means for receiving), to perform deriving at least one key performance indicator entry based on said key performance indicator optimization input, said at least one key performance indicator entry comprising at least said optimization direction of said key performance indicator and prioritized target values for said key performance indicator (thus the apparatus comprising corresponding means for deriving), to perform storing said at least one key performance indicator entry (thus the apparatus comprising corresponding means for storing), to perform deciding, for a cognitive function, a target value for said key performance indicator of said prioritized target values for said key performance indicator expected to be achieved by said cognitive function (thus the apparatus comprising corresponding means for deciding), and to perform providing said decided target value for said key performance indicator and said optimization direction of said key performance indicator to said cognitive function (thus the apparatus comprising corresponding means for providing).

For further details regarding the operability/functionality of the individual apparatuses, reference is made to the above description in connection with any one of FIGS. 1 to 7, respectively.

For the purpose of the present invention as described herein above, it should be noted that
- method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for network objectives management. Such measures for enabling network objectives management in radio access networks exemplarily comprise receiving a key performance indicator optimization input indicative of a key performance indicator and an optimization direction of said key performance indicator, deriving at least one key performance indicator entry based on said key performance indicator optimization input, said at least one key performance indicator entry comprising at least said optimization direction of said key performance indicator and prioritized target values for said key performance indicator, storing said at least one key performance indicator entry, deciding, for a cognitive function, a target value for said key performance indicator of said prioritized target values for said key performance indicator expected to be achieved by said cognitive function, and providing said decided target value for said key performance indicator and said optimization direction of said key performance indicator to said cognitive function.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
CE Coordination Engine
CF cognitive function
CME Configuration Management Engine
CNM cognitive network management
DAE Decision & Action Engine
EMA Environment Modelling & Abstraction
KPI key performance indicator
LTE Long Term Evolution
LTE-A Long Term Evolution Advanced
NM network management
NOM Network Objective(s) Manager
OAM operations, administration and management
OBNM objective based network management
ODO Objective Definition Operation
QoE Quality of Experience
RAN radio access network
SNOT sub-net objectives translator
SON self-organizing networks
TAO Target Adjustment Operation
TDO Target Definition Operation

The invention claimed is:

1. A method for enabling network objectives management in radio access networks, the method comprising
  receiving a key performance indicator optimization input indicative of a key performance indicator and an optimization direction of said key performance indicator,
  deriving at least one key performance indicator entry based on said key performance indicator optimization input, said at least one key performance indicator entry comprising at least said optimization direction of said key performance indicator and prioritized target values for said key performance indicator, storing said at least one key performance indicator entry, deciding, for a cognitive function, a target value for said key performance indicator of said prioritized target values for said key performance indicator expected to be achieved by said cognitive function, providing said decided target value for said key performance indicator and said optimization direction of said key performance indicator to said cognitive function, receiving, from said cognitive function, observations on conflicts with respect to said target value for said key performance indicator.

2. The method according to claim 1, wherein
said deciding is based on a priority assigned to said respective target value in said prioritized target values,
said deriving is based on said observations on conflicts with respect to said target value for said key performance indicator.

3. The method according to claim 2, wherein
said deciding is further based on said observations on conflicts with respect to said target value for said key performance indicator.

4. The method according to claim 1, further comprising
checking consistency of said target value decided for said cognitive function with said optimization direction of said key performance indicator and/or external requirements on said target value for said key performance indicator.

5. The method according to claim 1, wherein
said key performance indicator optimization input comprises at least said optimization direction of said key performance indicator, an optimal target value for said key performance indicator, and a target value generation step size, and
said deriving is based on said optimization direction of said key performance indicator, said optimal target value for said key performance indicator, and said target value generation step size.

6. The method according to claim 5, wherein
in relation to said deriving, the method further comprises
generating a highest priority value of said prioritized target values for said key performance indicator by adopting said optimal target value for said key performance indicator and a predetermined number of lower priority values with decreasing priority by, dependent on said optimization direction of said key performance indicator, adding or subtracting said target value generation step size to or from the preceding generated target value.

7. The method according to claim 1, further comprising
receiving a key performance indicator definition input comprising at least said optimization direction of said key performance indicator and said prioritized target values for said key performance indicator, wherein
said deriving is based on said optimization direction of said key performance indicator and said prioritized target values for said key performance indicator.

8. The method according to claim 7, wherein
in relation to said deriving, the method further comprises
adopting said optimization direction of said key performance indicator and said prioritized target values for said key performance indicator.

9. The method according to claim 1, further comprising
receiving a key performance indicator adjustment input comprising at least a modification direction of said key performance indicator and a target value modification step size, wherein said deriving is based on said modification direction of said key performance indicator and said target value modification step size.

10. The method according to claim 9, wherein
in relation to said deriving, the method further comprises
re-generating each target value of said prioritized target values by, dependent on said modification direction of said key performance indicator, adding or subtracting said target value modification step size to or from said each target value of said prioritized target values.

11. An apparatus for enabling network objectives management in radio access networks, the apparatus comprising
at least one processor,
at least one memory including computer program code, and
at least one interface configured for communication with at least another apparatus,
the at least one processor, with the at least one memory and the computer program code, being configured to cause the apparatus to perform:
receiving a key performance indicator optimization input indicative of a key performance indicator and an optimization direction of said key performance indicator,
deriving at least one key performance indicator entry based on said key performance indicator optimization input, said at least one key performance indicator entry comprising at least said optimization direction of said key performance indicator and prioritized target values for said key performance indicator,
storing said at least one key performance indicator entry,
deciding, for a cognitive function, a target value for said key performance indicator of said prioritized target values for said key performance indicator expected to be achieved by said cognitive function, and
providing said decided target value for said key performance indicator and said optimization direction of said key performance indicator to said cognitive function,
receiving, from said cognitive function, observations on conflicts with respect to said target value for said key performance indicator.

12. The apparatus according to claim 11, wherein
said deciding is based on a priority assigned to said respective target value in said prioritized target value.

13. The apparatus according to claim 11, wherein
said deriving is based on said observations on conflicts with respect to said target value for said key performance indicator.

14. The apparatus according to claim 11, wherein
said deciding is based on said observations on conflicts with respect to said target value for said key performance indicator.

15. The apparatus according to claim 11, wherein
the at least one processor, with the at least one memory and the computer program code, being further configured to cause the apparatus to perform
checking consistency of said target value decided for said cognitive function with said optimization direction of said key performance indicator and/or external requirements on said target value for said key performance indicator.

16. The apparatus according to claim 11, wherein
said key performance indicator optimization input comprises at least said optimization direction of said key performance indicator, an optimal target value for said key performance indicator, and a target value generation step size, and said deriving is based on said optimization direction of said key performance indicator, said optimal target value for said key performance indicator, and said target value generation step size.

17. The apparatus according to claim 16, wherein in relation to said deriving, the at least one processor, with the at least one memory and the computer program code, being further configured to cause the apparatus to perform generating a highest priority value of said prioritized target values for said key performance indicator by adopting said optimal target value for said key performance indicator and a predetermined number of lower priority values with decreasing priority by, dependent on said optimization direction of said key performance indicator, adding or subtracting said target value generation step size to or from the preceding generated target value.

18. The apparatus according to claim 11, wherein the at least one processor, with the at least one memory and the computer program code, being further configured to cause the apparatus to perform receiving a key performance indicator definition input comprising at least said optimization direction of said key performance indicator and said prioritized target values for said key performance indicator, wherein said deriving is based on said optimization direction of said key performance indicator and said prioritized target values for said key performance indicator, adopting said optimization direction of said key performance indicator and said prioritized target values for said key performance indicator.

19. The apparatus according to claim 11, wherein the at least one processor, with the at least one memory and the computer program code, being further configured to cause the apparatus to perform receiving a key performance indicator adjustment input comprising at least a modification direction of said key performance indicator and a target value modification step size, wherein said deriving is based on said modification direction of said key performance indicator and said target value modification step size.

20. An apparatus for enabling network objectives management in radio access networks, the apparatus comprising receiving circuitry configured to receive a key performance indicator optimization input indicative of a key performance indicator and an optimization direction of said key performance indicator, deriving circuitry configured to derive at least one key performance indicator entry based on said key performance indicator optimization input, said at least one key performance indicator entry comprising at least said optimization direction of said key performance indicator and prioritized target values for said key performance indicator, storing circuitry configure to store said at least one key performance indicator entry, deciding circuitry configured to decide, for a cognitive function, a target value for said key performance indicator of said prioritized target values for said key performance indicator expected to be achieved by said cognitive function, and providing circuitry configured to provide said decided target value for said key performance indicator and said optimization direction of said key performance indicator to said cognitive function.

\* \* \* \* \*